April 11, 1939.  I. V. BRUMBAUGH  2,154,030
AUTOMATIC TEMPERATURE REGULATOR
Filed July 12, 1933  2 Sheets-Sheet 1
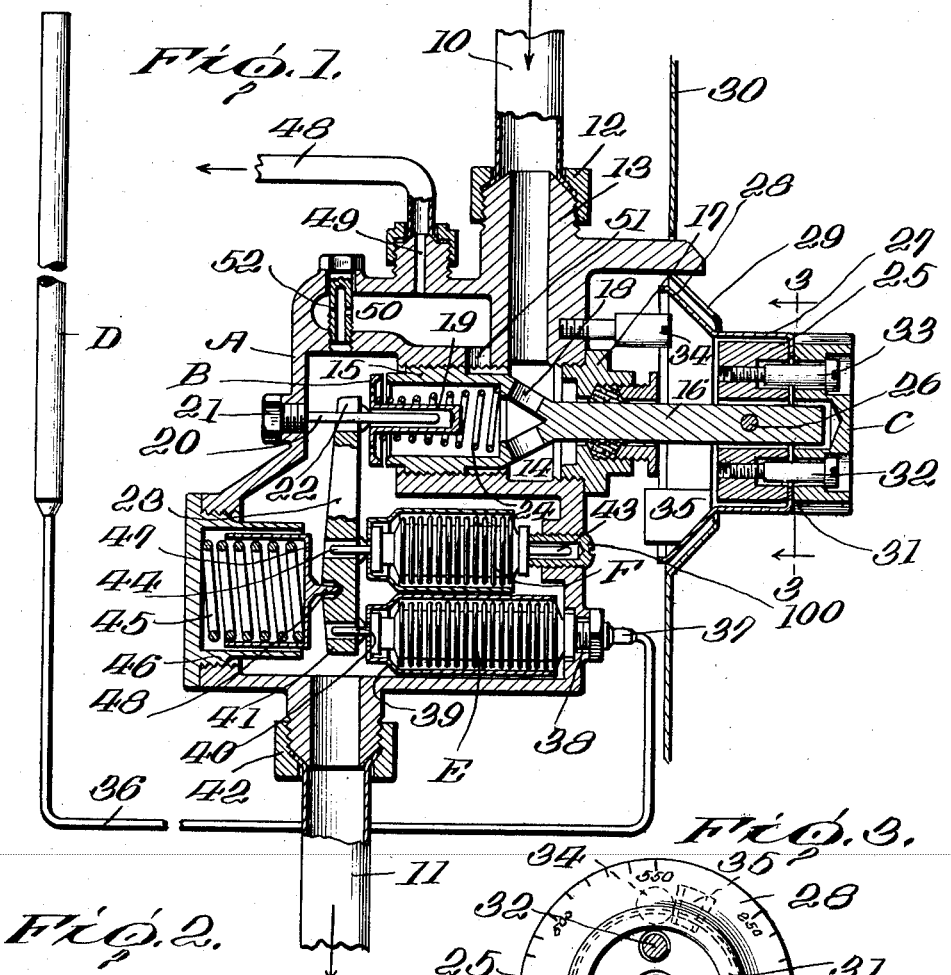
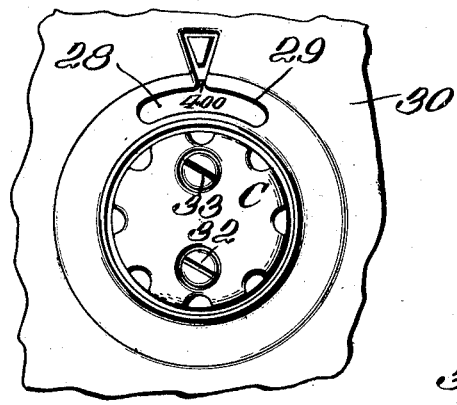
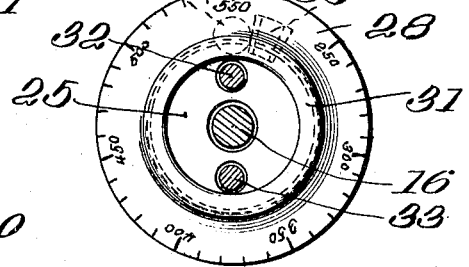
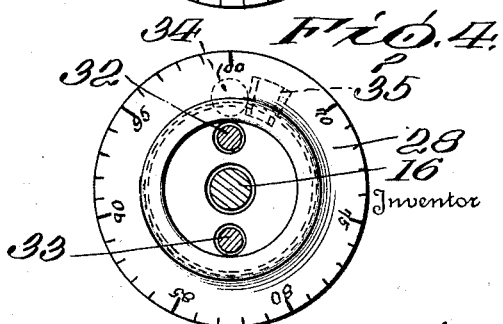
Inventor
I. V. Brumbaugh
By Patterson, Wright & Patterson
Attorneys

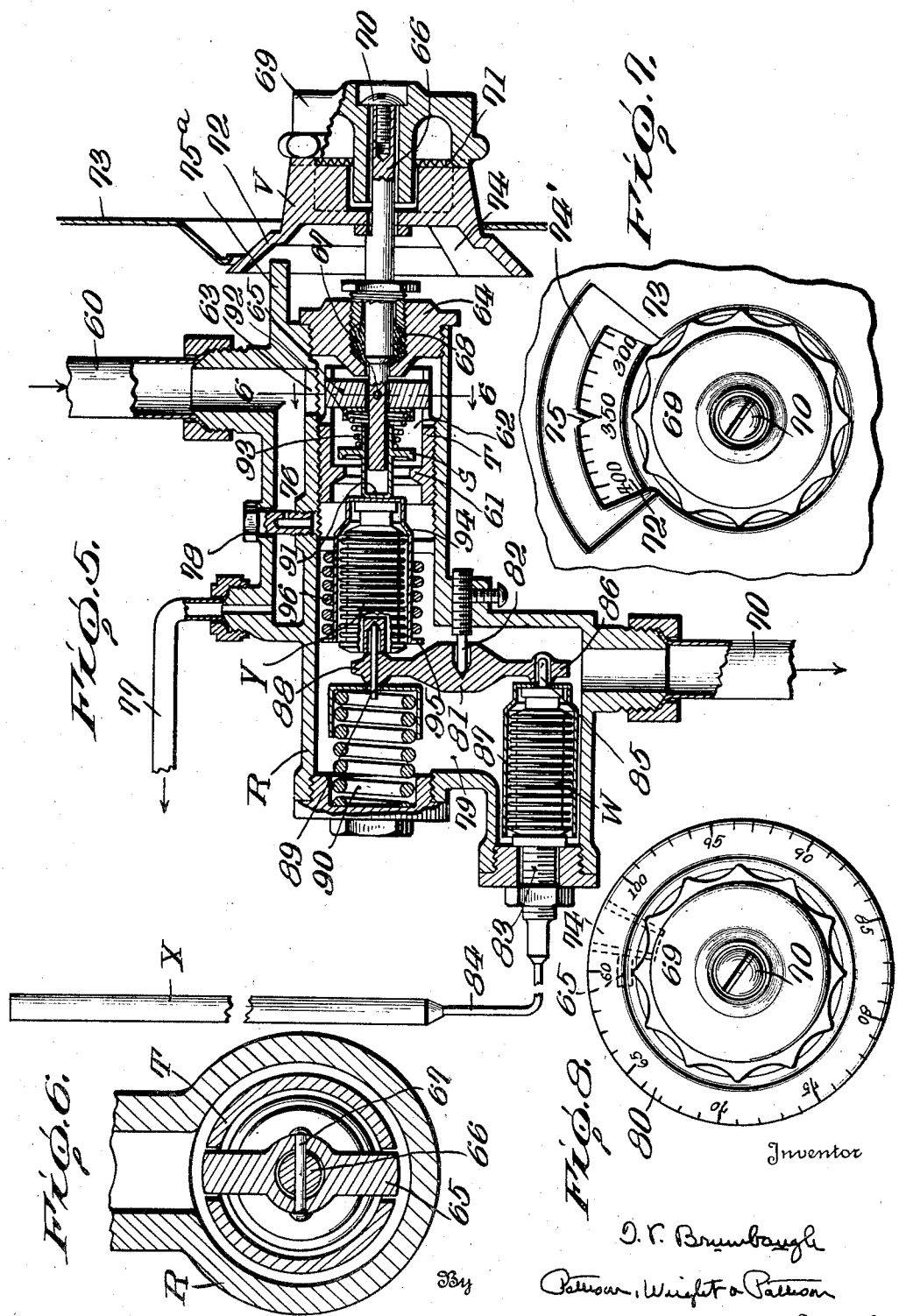

Patented Apr. 11, 1939

2,154,030

UNITED STATES PATENT OFFICE 2,154,030

AUTOMATIC TEMPERATURE REGULATOR

Isaac Vernon Brumbaugh, St. Louis, Mo., assignor to American Stove Company, St. Louis, Mo., a corporation of New Jersey Application July 12, 1933, Serial No. 680,134

11 Claims. (Cl. 236—15)

This invention relates to an improvement in an automatic temperature regulator and is directed more particularly to a device which might be termed a bellows type automatic temperature regulator inasmuch as a bellows is utilized for imparting movement to a valve which controls the flow of fuel to a heating medium.

The primary object of the invention is the provision of an automatic temperature regulator of a new and improved construction.

A still further object of the invention is the provision of an improved automatic temperature regulator of the so-called bellows type wherein a compensator is provided to offset any expansion of the bellows brought about by variation in the temperature of the gas surrounding the bellows.

Further specific objects, novel features of construction and improved results of the regulator will appear in more detail from the following description when read in the light of the accompanying drawings.

The present regulator is particularly adapted for employment in connection with the ovens of gas stoves for the purpose of maintaining in said ovens a predetermined temperature, but the employment of the device is not limited to gas stoves or ranges as it can be equally well employed for maintaining any predetermined desired temperature in a room or chamber by the application of the regulator to the device providing the heat to the room or chamber. In other words, the device is applicable to any heat providing device for the purpose of controlling the amount of heat given off by said device.

Describing the invention in general terms, the device provides or includes a bulb which is intended to be placed in the oven of a gas range or in the room or chamber to be heated, and this bulb contains a fluid which expands when heated. This bulb has a connection with an expansible bellows or like chamber which in turn has connection with a movable element for the purpose of controlling a valve through which the fuel delivery to the heating device must flow. By reason of the construction described a rise in temperature in the oven or chamber causes an expansion of the fluid within the bulb and a resultant expansion of the bellows or expansible chamber and a closing of the valve to cut off the supply of fuel to the heating device. The purposes of the compensator, the gas by-pass around the fuel control valve and other specific details of construction will appear hereinafter.

In the drawings:

Figure 1 is a sectional view through the improved regulator, the bulb being shown in full lines;

Fig. 2 is a detail view in front elevation of the regulator control wheel and its calibrated dial;

Fig. 3 is a sectional view taken on the line 3—3 of Figure 1;

Fig. 4 is a vertical sectional view taken on the line 3—3 of Figure 1, a dial such as would be used for room temperature control having been substituted for the dial shown in Figure 3 of the drawings;

Fig. 5 is a sectional view of a modified form of regulator;

Fig. 6 is an enlarged detail sectional view taken on the line 6—6 of Figure 5 looking in the direction indicated by arrows;

Fig. 7 is a view in front elevation of the regulator control wheel carrying a calibrated dial suitable for gas oven temperature control;

Fig. 8 is a view in front elevation of the regulator control wheel carrying a dial suitable for room temperature control.

Having reference now particularly to the preferred form of invention as illustrated in Figure 1 of the drawings, and describing the regulator there illustrated as it would be used in connection with the oven of a gas stove, it will be seen that A represents a housing or a casing having at one side a fuel inlet pipe 10 and at approximately its opposite side a fuel outlet pipe 11. The pipe 11 is intended to convey fuel to the burner or burners within the oven of the gas stove. The pipe 10 has a gas-tight connection as at 12 with a threaded projected nipple 13 the inner end of which communicates with the valve chamber 14 within the casing or housing. A valve cage 15 is threadedly mounted within the valve chamber for rotary movement therein and is provided with an extending stem 16 which extends outwardly beyond the chamber through a suitable packing within the nut 17 which forms a closure at one end of the valve chamber. As is readily apparent from the drawings, the valve cage 15 is hollow and forms a passageway for the fuel which enters the cage through suitable openings 18 provided in the cage stem and having communication with the valve housing 14 before mentioned. The valve proper is designated by B and is of a disc-like form having on its inner side a tubular extension 19 extending into and lengthwise of the valve cage. A guide pin 20 supported as at 21 from the regulator housing extends through the bifurcated end 22 of the valve operating arm or lever 23 into the tubular portion 19 of the valve and acts as a supporting guide for the valve. A coil spring 24 is positioned within the valve cage and has a tendency to constantly hold the valve open and in engagement with the bifurcated end 22 of the valve actuating arm or lever 23.

The valve cage is of course rotated by manipulation of its extending stem 16. As a convenient means of rotating said stem it carries adjacent its outer end a collar 25 which is secured to the stem by means of a pin or set-screw 26. A cup-like member 27 is supported upon the collar. This cup-like member has a flared portion 28 carrying on its outer face the temperature calibrations, as clearly appears in Figure 3 of the drawings. These calibrations are visible to the operator through a suitable opening 29 provided in the shield or panel 30 behind which the regulator is intended to be concealed. This cup-like member has an inturned flange portion 31 which is adapted to abut the outer face of the collar 25. The hand operable wheel is designated by C and is secured to the sleeve 25 by means of two screws 32 and 33.

A screw 34 is secured to the regulator housing A and extends outwardly to a point within the outwardly flared portion 28 of the dial or cup-like member 27 and the flared portion of the cup-like member on its inner side carries an outwardly extending lug 35. When the dial or cup-like member is rotated by the hand wheel the lug 35 thereof will engage the screw 34 and thus permit only a single revolution of the dial by the hand wheel.

The dial 27 is held in its adjusted position through being clamped against the collar by the hand wheel when the screws 32 and 33 are tightened down and thus to adjust the regulator it is only necessary to loosen the screws 32 and 33 to permit rotation of the dial independent of rotation of the valve cage. Once the adjustment of the dial is made the screws 32 and 33 are tightened down and the dial is thus held in clamped adjusted position by the hand wheel C.

The bulb filled with the liquid which expands when heated, is designated at D and is of course positioned within the gas stove oven. This bulb has connection with the regulator bellows E through the medium of a tubing, preferably flexible, 36. This tube 36 is connected as at 37 with the regulator bellows, which bellows is supported within the regulator housing A, as clearly indicated at 38. The bellows is surrounded by a cap or sleeve 39 which is secured to the inner end of the bellows as at 40 and prevents any buckling of the bellows. One end 41 of the valve operating lever bears against the free end of the regulator bellows E and is guided in its movement in respect to the bellows by means of a pin 40.

The compensator is designated at F and is of bellows-like form, but is much shorter than the regulator bellows E. This compensator bellows is supported within the regulator housing A as indicated at 43, and its inner end bears against the valve operating lever 23 at a point intermediate its ends and is guided in its connection with the valve lever by a pin 44.

There is of course, as has been described, liquid within the regulator bellows E and there is also liquid within the compensator bellows F. Liquid within these two bellows is kept under some pressure. A coil spring 45 mounted within the internal sleeve 46, which is threadedly mounted in the regulator housing, carries a cap 47 provided with an extending pin-like portion 48 which engages the valve operating lever at a point exactly intermediate the engagement of said lever by the pins 42 and 44 of the regulator bellows and the compensator bellows F respectively. This spring is provided to exert a force upon the valve lever and also keep the fluid within the two bellows E and F under pressure and the force of this spring is of course exerted equally against both of these bellows.

The purpose of the compensator bellows F is to maintain and offset the effect of the expansion of the liquid in the regulator bellows E, which expansion would be caused by the variation of the temperature of the atmosphere surrounding said regulator bellows. The compensator bellows is shorter than the regulator bellows, and this is necessary due to the construction which requires a shorter movement, that is expansion or contraction, of the compensator bellows to offset the expansion or contraction of the regulator bellows when both have been subjected to the same change in temperature as they naturally would be due to their close proximity to one another.

The pin 44 of the compensator bellows is the pivotal point for the valve operating lever. If the compensator bellows does not expand or contract the pivotal bearing point for this lever will not change. However, should the temperature surrounding the regulator bellows increase this would cause this bellows to expand, which in turn would of course cause the valve B to move towards its seat. The compensator bellows will prevent this movement of the valve towards its seat as the compensator bellows will expand due to the same temperature variation that expanded the regulator bellows. To meet and overcome this undesired movement of the regulator bellows the compensator bellows has to move only about two-thirds as much as the regulator bellows, and thus the compensator bellows is made shorter than the regulator bellows, as will be readily apparent, due to the different points of connection or engagement that the respective bellows have with the valve actuating lever 23.

When utilizing an automatic temperature regulator in connection with the ovens of a gas stove, a pilot light is ordinarily and usually maintained in the oven. To provide a constant gas supply to said pilot light a by-pass gas supply is provided which in Figure 1 of the drawings will be seen to be a pipe 48 having communications through a nipple 49 with the chamber 50 within the main regulator housing A. This chamber 50 has communication through an opening 51 with the valve chamber 14 at a point in front of the valve B.

It is also the usual practice to maintain at all times a small fire at the oven burner when the oven is in operation. In order to maintain such a flame it is necessary to by-pass fuel around the main control valve B. This is provided for by means of the hollow bolt or screw 52 which has communication with the chamber 50 and also communicates with the main regulator housing A at a point to one side of the fuel control valve B.

The construction appearing in Figure 4 needs practically no description. The construction here appearing is similar to that appearing in Figure 3 with the exception that the calibrations of the dial 28 are different from the calibrations used when the regulator is used for oven heat control. In oven heat control the temperatures run much higher than they would when room heat control is desired. With the exception of the calibrations themselves the constructions of Figures 3 and 4 are identical.

A few words will suffice to describe the operation of the automatic regulator. The hand wheel is set at the temperature it is desired to maintain in the oven of the stove. The rotation of the hand wheel rotates the valve cage and changes the position of the valve seat carried by the cage in respect to the valve B. The result is that if the desired temperature is of a high degree the valve must be moved a greater distance by the lever to effect the closing of the valve than it would have to be if the desired temperature is of a low degree. As appears in Figure 1 of the drawings the valve is slightly open and the oven burner is receiving gas through the regulator. The increase in temperature within the oven will expand the fluid within the bulb D which in turn transmits some of the expanded fluid to the regulator bellows E through the capillary tube 36. Expansion of this bellows against the end 41 of the valve lever tends to close the valve B and when the heat within the oven has expanded the fluid within the bulb sufficiently to in turn expand the regulating bellows E sufficiently to have moved the valve operating lever to close the valve the fuel supply to the oven burner is cut off. As the oven cools the fluid within the bulb D will contract and in like manner the regulating bellows E will contract and the bifurcated end of the valve operating lever will move away from the valve under the action of the coil spring 45. As a consequence the valve B which is at all times held in engagement against the bifurcated end of the valve lever by the spring 24 will move from its seat and open, thus again permitting the flow of fuel to the oven burner. In the maintenance of a given temperature in the oven the operation as described of the opening and closing of the valve will be repeated as the temperature rises and falls in the oven.

A modified form of the invention appears in Figures 5 to 8 inclusive of the drawings. The regulator illustrated in these figures of the drawings operates on the same principle as the preferred form of regulator already described, but the actual construction of the regulator in the modified form is somewhat different from that of the preferred form. Both forms of regulators will operate efficiently and the main difference between them is that in the preferred form of the invention the regulator is a little more compact by reason of the regulator and compensator bellows being adjacent to one another. The placing of these two bellows immediately adjacent one another has the advantage that both of them will be subjected to surrounding atmosphere of the same temperature.

Describing now the modified or alternate form of regulator, and having reference particularly to Figure 5 of the drawings, it will be seen that there is provided a regulator housing or casing R through which the fuel passes from its source of supply to the burner or heating element. The fuel inlet to the regulator housing is designated at 60 and the fuel outlet at 70. The passage of fuel through the regulator housing to the burner or heating element is under the control of the valve S. This valve S cooperates with a seat 61 which forms an integral part of the valve cage T which is threadedly mounted within the valve chamber 62 provided within the main regulator casing R. This valve chamber 62 is provided with an opening 63 which communicates with the main fuel inlet 60.

The outer end of the valve chamber is closed by a suitable cap nut 64 and the valve cage is provided with a head 65 to which an operating stem 66 is attached by means of a pin or set screw 67. This cage operating stem extends through a suitable packing 68 in the cap screw and at its outer end carries a hand knob or operating wheel 69 which is secured to the end of the stem 66 by means of a screw 70 or the like. A dial V is loosely mounted on the valve cage operating stem 66 in front of the stem operating knob 69 and has driving connection with the inner face or side of the knob by reason of the toothed arrangement indicated at 71. By reason of this construction the dial is rotated when the hand knob is rotated. By loosening the screw 70 the dial can be rotated independent of the knob and in this manner the regulator is properly set. The dial has a flared portion 72 which carries the temperature designations, which clearly appear in Figure 7 of the drawings. A shield or panel 73 is provided for concealing the main regulator and this shield is provided with an opening 74' and a pointer 75, all as clearly appears in Figure 7 of the drawings, whereby the operator can quickly and readily set the regulator to maintain in the stove oven, chamber or room the desired temperature. The dial on the inner side of its flare is provided with a lug 74 which is adapted to cooperate with the extending portion 75ª of the main regulator housing to act as a stop and prevent more than a single complete revolution of the dial and the valve cage. Adjacent the inlet end of the fuel supply pipe 60 the housing is provided with a chamber 76 and from this chamber there extends a pipe 77 for conveying and providing a constant gas supply to a pilot light (not shown) which would be positioned adjacent the burner or heating element.

It is also intended, especially when utilizing this regulator in connection with the oven of a gas stove, that a small flame be maintained at the main oven burner. Consequently a small fuel supply is by-passed around the main control valve S. This by-pass comprises a hollow screw 78 which has communication with the chamber 76 and also has communication with the main regulator housing chamber 79 at a point at one side of the valve S which controls the main fuel inlet to said main regulator chamber 79.

It is to be understood that the present regulator is applicable for use in connection with room heaters, or in fact for use in connection with many different kinds of heating devices. In Figure 8 of the drawings there is illustrated a dial 80 carrying calibrations such as would be used with the regulator were it to be used for maintaining a set temperature within a room. Room temperatures are of course not as high as temperatures within cooking ovens and as a consequence the calibrations upon the dial 80 run to numbers much lower than those appearing on the dial V.

A valve operating lever 81 is positioned within the main chamber 79 of the regulator housing and is pivotally supported intermediate its length upon a suitable pin 82 which pin is adjustably mounted, as clearly indicated.

The expansible regulator bellows is designated W and is supported within the main chamber 79 of the regulator housing as indicated at 83. The thermo-element, which is in the form of a bulb is designated by X and contains a high temperature expansible fluid. This bulb X is of course placed within the oven chamber or room where it is desired to control the temperature. The bulb X connects with the regulator bellows W through a pipe 84. Consequently as the fluid within the bulb is expanded through the application of heat the expansible regulator bellows W is lengthened.

The free end of the regulator bellows is provided with a pin 85 which is in engagement with one end 86 of the valve operating lever 81. A cap or sleeve 87 surrounds the bellows W to prevent any buckling of the bellows during its expansion or contraction.

An expansible compensator bellows Y is positioned within the regulator housing and engages the opposite end 88 of the valve operating lever 81. This compensator bellows is positioned at the opposite side of the lever from the regulator bellows and its engagement with the lever is maintained by means of a pin 89.

A coil spring 90 engages the end 88 of the valve operating lever 81 at a point diametrically opposed to the engagement of this end of the lever by the compensator bellows Y.

The main fuel control valve S is of disc-like form and provided with a hollow stem which telescopes the inner end of the valve cage stem 66. One end 91 of this valve stem engages the end of the compensator bellows Y. A coil spring 93 is positioned between the head 65 of the valve cage and the valve S and tends at all times to hold the stem of the valve in engagement with the end of the compensator bellows and likewise tends at all times to move the valve to a closed position in respect to its seat.

A sleeve 94 surrounds the compensator bellows and prevents it from buckling and this sleeve is provided with a flanged end 95 which is engaged by a coil spring 96 which tends at all times to exert a pressure upon the compensator bellows and therefore upon the end 88 of the valve lever in a direction towards the coil spring 90.

The liquid within both the regulator and compensator bellows is and must be kept under some pressure and it is this condition that requires the use of the springs 90 and 96. The spring 90 exerts a force approximately twice that of the force exerted by the spring 96. Due to the greater power of the spring 90 the fluid within both of the bellows is put under compression and a force is exerted at all times which tends to hold the main fuel control valve S against the force of the coil spring 93.

The purposes of the compensator bellows Y in this modified form of the invention is the same as that of the compensator bellows in the preferred form of the invention namely, to prevent any operation or movement of the fuel control valve by reason of temperature variation of the atmosphere surrounding the regulator bellows.

When the liquid within the bulb X is heated it will expand and this liquid will flow into the regulator bellows W and cause the length of that bellows to increase and this increased length of the bellows will operate the valve operating lever to move to the left against the tension of the coil spring 90, thus permitting the compensator bellows to move to the left, which will in turn permit the main fuel control valve to move towards the left and towards its seat. Should the liquid within the regulator bellows W become heated this would cause an expansion of the liquid and a lengthening of the bellows, which would cause some movement of the main fuel control valve towards its seat. This action is not desirable and it is for this reason that the compensator bellows is provided. The varying temperature of the atmosphere surrounding the regulator bellows would also affect the liquid within the compensator bellows and cause it to expand with the result that the compensator bellows would lengthen and the position of the main fuel control valve would not be altered. The net result of this is of course that the temperature within the regulator housing may vary without causing any movement whatsoever of the main fuel control valve S, and a provision of this kind is not only desirable but is absolutely necessary if a true predetermined temperature is to be maintained in the oven chamber or room within which the thermo bulb X is positioned. Consequently applicant has made a decided improvement by providing a compensating means and made it possible to produce an accurate, dependable and satisfactory automatic heat regulator of the bulb and bellows type. Experimentation has proven that without some compensating means of taking care of the unintended and undesirable expansion of the regulating bellows it is impossible to produce an automatic temperature regulator which is accurate to an appreciable degree or is dependable and satisfactory in its operation.

By lengthening and bending the pipes which interconnect the thermo bulb with the regulator bellows it is possible to place the regulator in any place desired, even at a point very remote to the chamber within which it is desired to maintain the given temperature. This feature is of decided advantage when the device is used in connection with a gas stove as it makes it possible to place the regulator at any desired place on the stove. It is intended that the thermo bulb be filled with a high temperature liquid when the bulb is used in the oven of a gas stove. When the device is used in connection with a room heater the liquid used in the bulb and in the bellows would not be subjected to particularly high temperatures and there are many liquids suitable for use with the regulator. When the device is used in connection with a gas stove the regulator housing would of course be located at some point exterior of the oven and as a consequence would not be subjected to a temperature anywhere near as great as that in the oven, and it would be possible to fill the compensator bellows with a different liquid than that used in the bulb and regulator bellows. However, should a different liquid be used in the compensating bellows from that used in the bulb and regulator bellows there would be a different co-efficient of expansion between the liquid in the compensator bellows and the regulator bellows. This would mean that the respective lengths of the compensator and regulator bellows would have to be worked out under such conditions and their respective and comparative lengths would be dependent upon the particular kind of fluid or liquid used in these bellows.

When the device is used in the oven of a gas stove it will be realized of course that the liquid for filling the bulb and its associated bellows must be of such a character that it will not change to a solid, that is to say, that it will not crystalize at low temperatures such as it might be subjected to when the stove is being transported from its place of manufacture to its place of use or sale, and that the liquid will not volatilize at the maximum temperatures to which the bulb will be subjected in the oven when the stove is in use. Additionally the liquid must be of such a character that it will not attack the bulb, the bellows or the tube interconnecting these members. It will be understood that these members will be composed of a metal, probably and most preferably copper, and it would be highly disadvantageous should the liquid attack these metallic members. The liquid should be non-metallic. As an instance of the liquids which can be used for filling the bulb, bellows and their connecting tube, I have found a petroleum product to be satisfactory; I have also found a liquid composed of a mixture of diphenyloxide and diphenyl sulphide to be admirably suited; I have also found a liquid composed of a mixture consisting of seven parts of diphenyloxide to one part of diphenyl-ketone to be satisfactory in use.

From the foregoing description it will be readily apparent that a greatly improved automatic heat regulator of the bulb and bellows type has been produced.

Referring to the preferred form of the device as illustrated in Figure 1, attention is called to the fact that an adjustment of the device can be obtained by the manipulation of the adjusting screw 100.

Having thus described my invention what I claim and desire to secure by Letters Patent is:

1. An improved automatic control device for regulating temperature, comprising a bulb subjected to the temperature to be controlled and a regulator mechanism in combination therewith, a fuel pipe, said regulator including a valve for controlling the passage of fuel through said pipe, a regulator bellows having a conduit interconnecting it with the bulb, an expansible fluid in the bulb and in the bellows, a pivotally mounted valve actuating member interconnecting the valve and the regulator bellows, a compensator bellows carrying an expansible fluid and having operative connection with the valve operating member, both of said bellows and said valve being at the same side of the valve actuating member, and resilient means at the opposite side of said valve actuating member for holding said member in operative connection with both of said bellows, the parts operating for the purpose described.

2. An improved automatic control device for regulating temperature, comprising a bulb subjected to the temperature to be controlled and a regulator mechanism in combination therewith, a regulator housing having a fuel inlet and a fuel outlet, a valve for controlling the passage of fuel through the regulator, a regulator bellows having a conduit interconnecting it with the bulb, an expansible fluid in the bulb and in the bellows, a pivotally mounted lever having one end in engagement with said regulator bellows, a compensator bellows carrying an expansible fluid and having operative connection at one end with the valve and at its opposite end with the other end of said lever, said bellows being positioned at opposite sides of the lever, and resilient means engaging the lever for holding the lever in operative engagement under spring tension with both of said bellows, the parts operating as and for the purpose described.

3. An improved automatic control device for regulating temperature, comprising a bulb subjected to the temperature to be controlled and a regulator mechanism in combination therewith, said regulator including a housing having a fuel inlet and a fuel outlet, a valve for controlling the passage of fuel through the regulator, a regulator bellows having a conduit interconnecting it with the bulb, an expansible fluid in said bellows and bulb, a compensator bellows carrying an expansible fluid, a pivotally mounted lever, said regulator bellows and said compensator bellows engaging the opposite ends and opposite sides of said lever, said compensator bellows having operative connection with the valve, resilient means engaging said lever at its end opposite the compensator bellows, resilient means urging the compensator bellows towards the lever, and resilient means urging the valve towards its seat and towards the compensator bellows, the parts operating as and for the purpose described.

4. An improved automatic control device for regulating temperature, comprising a bulb subjected to the temperature to be controlled and a regulator mechanism in combination therewith, a fuel line, said regulator including a valve for controlling the passage of fuel through said pipe, a regulator bellows having a conduit interconnecting it with the bulb, an expansible fluid in the bulb and in the bellows, a pivotally mounted valve actuating member interconnecting the valve and the regulator bellows, a compensator bellows carrying an expansible fluid and having operative connection with the valve operating member, both of said bellows and said valve being at the same side of the valve actuating member, one end of the valve actuating member being in engagement with the valve and its opposite end being in engagement with the regulator bellows, the compensator bellows engaging the valve actuating member at a point intermediate its length, a member engaging said valve actuating member at a point intermediate the engagement of said member by both of said bellows for holding the valve actuating member in engagement with both of said bellows, the parts operating for the purpose described.

5. An improved automatic control device for regulating temperature and of a structure as defined in claim 4, wherein the member which holds the valve actuating member in operative engagement with both of said bellows is positioned at and engages the valve actuating member on its side opposite its engagement with both of said bellows and at a point midway between the engagement of the valve actuating member with both of said bellows.

6. An improved automatic control device for regulating temperature and of a structure as defined in claim 4, wherein the regulator bellows is longer than the compensator bellows and the regulator bellows engages the valve actuating member at one of its ends and the compensator bellows engages the valve actuating member intermediate its ends.

7. In a control for the regulation of temperature, the combination of a bulb subjected to the temperature to be controlled, a bellows connected with said bulb and containing an expansible fluid, a housing provided with a fuel inlet and a fuel outlet, a valve within said housing for controlling the flow of fuel therethrough, a pivotally mounted lever within said housing and having operative engagement with the valve and with the bellows within said housing, a compensating bellows containing an expansible fluid and having operative engagement with the pivotally mounted lever to prevent operation of the valve by movement of the bellows due to temperature changes within the housing, both of said bellows and valve having engagement with the same side of said valve operating lever, and resilient means engaging the valve actuating lever at its side opposite to the engagement of said lever by the pair of bellows and the valve for holding the lever in operative engagement with said members.

8. An automatic control device for regulating temperature, comprising a bulb subjected to the temperature to be controlled and a regulator mechanism in combination therewith, said regulator mechanism having a fuel inlet and a fuel outlet, a valve for controlling the passage of fuel through the regulator, a pivotally mounted lever having operative connection at one side of its pivotal mounting with the valve for operating the same, a regulator bellows having a conduit interconnecting it with the bulb, an expansible fluid in the bulb and in said bellows, a compensator bellows containing an expansible fluid, one of said bellows having operative connection with valve operating lever at one side of its pivotal support and the other of said bellows having operative connection with the valve operating lever at the opposite side of its pivotal support and said compensator bellows operatively connected with the lever at a point between the pivotal support of the lever and the valve, the parts operating as and for the purpose described.

9. An automatic control device for regulating temperature, comprising a bulb positioned to be subjected to the temperature to be controlled and a regulator mechanism in combination therewith, said regulator mechanism having a fuel inlet and a fuel outlet, a valve controlling the passage of fuel through the regulator, means normally tending to hold said valve in an open position, a pivotally mounted lever adapted to move said valve to a closed position, a regulator bellows having a conduit interconnecting it with the bulb, an expansible fluid in the bulb and in said bellows, a compensator bellows containing an expansible fluid, said bellows having operative connection with the valve operating lever at opposite sides of the pivotal support thereof, whereby the compensator bellows will neutralize any movement imparted to the lever due to expansion of the regulator bellows by extraneous heat, and said pivotal support for said lever being adjustable, for the purpose described.

10. In a heat control device, the combination of an oven, a fuel pipe having a valve therein, a bellows exterior of said oven for actuating the valve, a bulb located in the oven and connected to the bellows, a thermo-responsive material in the bulb and in the bellows, a second bellows closely associated with said first named bellows and also carrying a thermo-responsive material, a valve actuating member having operative connection at one end with said valve and at its opposite end with said first bellows, operative engagement between the second bellows and said valve actuating member at a point intermediate its ends, means engaging said valve actuating member at a point intermediate the engagement of said member with said pair of bellows and holding said valve actuating member in engagement with said bellows, and said second bellows constituting a compensator which prevents any movement of the valve by the first bellows due to a change in temperature exterior of the oven and local to both bellows.

11. A construction such as defined in claim 4, wherein the member which engages the valve actuating member for holding said member in engagement with both of said bellows is resiliently urged against said valve actuating lever.

ISAAC VERNON BRUMBAUGH.